United States Patent
Zhai et al.

(10) Patent No.: US 8,855,037 B2
(45) Date of Patent: Oct. 7, 2014

(54) SCHEDULING PROCESSING METHOD FOR MULTIMEDIA BROADCAST AND MULTICAST SERVICE AND LOWER-LAYER NETWORK ELEMENT

(75) Inventors: Hengxing Zhai, Shenzhen (CN); Jianxun Ai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 319 days.

(21) Appl. No.: 13/257,897

(22) PCT Filed: Jan. 4, 2010

(86) PCT No.: PCT/CN2010/070012
§ 371 (c)(1),
(2), (4) Date: Jan. 5, 2012

(87) PCT Pub. No.: WO2011/003287
PCT Pub. Date: Jan. 13, 2011

(65) Prior Publication Data
US 2012/0093055 A1    Apr. 19, 2012

(30) Foreign Application Priority Data
Jul. 6, 2009    (CN) .......................... 2009 1 0158909

(51) Int. Cl.
*H04W 4/06*    (2009.01)
*H04W 72/00*    (2009.01)
*H04L 5/00*    (2006.01)
*H04L 12/18*    (2006.01)
*H04W 72/12*    (2009.01)

(52) U.S. Cl.
CPC ......... *H04L 12/1881* (2013.01); *H04W 72/121* (2013.01); *H04W 72/005* (2013.01); *H04W 4/06* (2013.01); *H04L 5/003* (2013.01); *H04L 12/189* (2013.01); *H04L 5/0078* (2013.01)

USPC ........ 370/312; 370/394; 370/395.5; 370/432; 370/470

(58) Field of Classification Search
USPC .............. 370/312, 328–335, 394, 395.4, 432, 370/470; 455/426.1, 446, 507
See application file for complete search history.

(56) References Cited

U.S. PATENT DOCUMENTS

| 2003/0174678 | A1* | 9/2003 | Chang et al. .................. 370/335 |
| 2004/0008646 | A1* | 1/2004 | Park et al. ..................... 370/331 |

(Continued)

FOREIGN PATENT DOCUMENTS

| CN | 1476198 A | 2/2004 |
| CN | 1747399 A | 3/2006 |

(Continued)

OTHER PUBLICATIONS

Service multiplexing and signalling for eMBMS Apr. 29, 2009.

(Continued)

*Primary Examiner* — Michael Thier
*Assistant Examiner* — Vincelas Louis
(74) *Attorney, Agent, or Firm* — Oppedahl Patent Law Firm LLC

(57) ABSTRACT

A scheduling processing method for a MBMS service and a lower-layer network element are provided. The method is used for each lower-layer network element to perform scheduling processing for data of an MBMS service received from an upper-layer network element, in which the lower-layer network element receives information sent by a designated network element, the information is used for indicating a scheduling period of the MBMS service; then the lower-layer network element performs scheduling processing for the data of the received MBMS service according to the scheduling period of the MBMS service.

17 Claims, 3 Drawing Sheets

(56) References Cited

U.S. PATENT DOCUMENTS

| | | |
|---|---|---|
| 2004/0229605 A1* | 11/2004 | Hwang et al. ............. 455/426.1 |
| 2005/0237972 A1 | 10/2005 | Van Dervelde |
| 2006/0107287 A1 | 5/2006 | Lee |
| 2007/0183358 A1* | 8/2007 | Cai ............................. 370/328 |
| 2008/0045224 A1* | 2/2008 | Lu et al. ...................... 455/446 |
| 2008/0084837 A1* | 4/2008 | Watanabe et al. ........... 370/312 |
| 2008/0299955 A1 | 12/2008 | Lee |
| 2009/0016254 A1 | 1/2009 | Lee |
| 2009/0141646 A1 | 6/2009 | Legg |
| 2009/0147717 A1* | 6/2009 | Cai ............................. 370/312 |
| 2010/0113056 A1 | 5/2010 | Chen |
| 2010/0195558 A1* | 8/2010 | Koskinen .................... 370/312 |
| 2011/0021224 A1* | 1/2011 | Koskinen et al. ........... 455/507 |
| 2011/0090814 A1 | 4/2011 | Legg |

FOREIGN PATENT DOCUMENTS

| | | |
|---|---|---|
| CN | 1897745 A | 1/2007 |
| KR | 20020053403 A | 7/2002 |
| KR | 1020050073114 A | 7/2005 |
| KR | 1020070009602 A | 1/2007 |
| KR | 1020080095892 A | 10/2008 |
| WO | 2005099133 A1 | 10/2005 |
| WO | 2007024065 A1 | 3/2007 |
| WO | 2007078164 A1 | 7/2007 |
| WO | 2007092691 A2 | 8/2007 |
| WO | 2008113262 A1 | 9/2008 |
| WO | 2008151069 A1 | 12/2008 |

OTHER PUBLICATIONS

E-MBMS Service multiplexing, Scheduling and data handling Document Nov. 12, 2007.
MBMS Dynamic Scheduling Apr. 28, 2009.
Supplementary European Search Report in European application No. 10796664.0, mailed on Dec. 7, 2012.
International Search Report in international application No. PCT/CN2010/070012, mailed on Apr. 15, 2010.
English Translation of the Written Opinion of the International Search Authority in international application No. PCT/CN2010/070012, mailed on Apr. 15, 2010.
Dynamic scheduling information transmission Jun. 29-Jul. 3, 2009.
Further eMBMS control plane details Jul. 3, 2009.

* cited by examiner

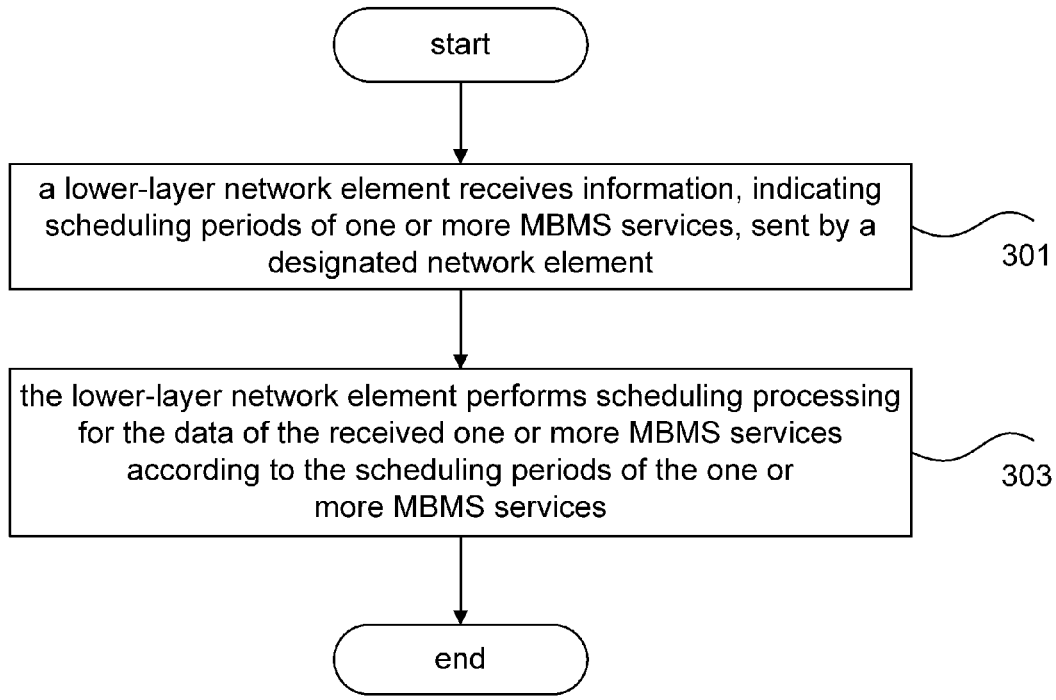
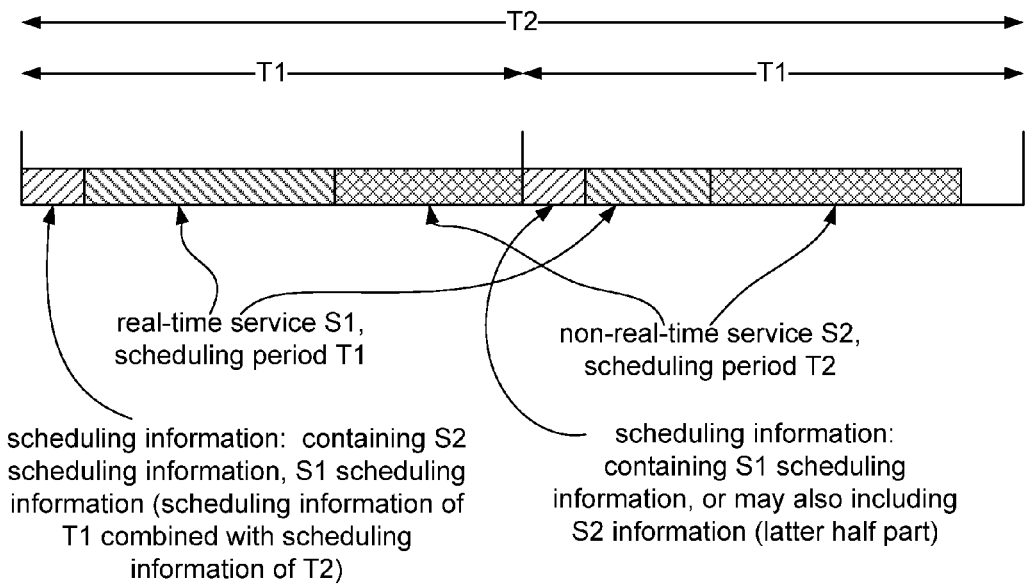

SCHEDULING PROCESSING METHOD FOR MULTIMEDIA BROADCAST AND MULTICAST SERVICE AND LOWER-LAYER NETWORK ELEMENT

TECHNICAL FIELD

The present invention relates to the field of mobile communication technology, especially to a scheduling processing method for a Multimedia Broadcast and Multicast Service (MBMS) and a lower-layer network element.

BACKGROUND

At present, 3rd Generation Partnership Project (3GPP) has put forward MBMS which can realize data transmission from a data source to multiple targets.

In Long Term Evolution (LTE), the MBMS service can be sent in a multicast mode, this sending mode is called a Multicast/Broadcast over Single Frequency Network (MBSFN) sending mode and the MBMS service sent in the multicast mode is called an MBSFN service. The characteristics of the MBMS multi-cell transmission comprise: 1) synchronous transmission in an MBSFN area; 2) supporting the combination of multi-cell MBMS transmission; 3) mapping a Multicast Traffic Channel (MTCH) and a Multicast Control Channel (MCCH) to a Multicast Channel (MCH) transmission channel in a point-To-multipoint (p-T-m) mode; 4) maintaining the MBSFN synchronous area, MBSFN area, MBSFN transmission, advertisements and reserved cells in a semi-static configuration by operation. User Equipment (UE) of a multiple cells can receive many pieces of MBMS data with same content and perform an SFN combination to increase the gain of a received signal. Multiple cells, which send a same MBMS service through the MBSFN mode by using same physical resources, form an MBSFN area. In an LTE networking, an MBSFN area has multiple MBSFN services, and all the MBSFN services in one MBSFN area are called an MBSFN service group. Each cell in an MBSFN area is configured with a completely identical MBSFN service group. The MTCH and MCCH of multiple MBSFN services with the same MBSFN area can be multiplexed to an MCH. The MCCH and multiple MTCHs (namely multiple logical channels) of the same MBSFN area can be mapped to the same transmission channel MCH.

As shown in FIG. 1, in order to increase the transmission efficiency of the MTCHs, the multiple MTCHs carried on an MCH can adopt a dynamic scheduling method, and two or more MTCHs are multiplexed to one MBSFN sub-frame and take up part of the resources of the sub-frame. In the prior art, MSAP occasion is used for indicating all multicast resources contained in the MCH corresponding to one MSAP during a dynamic scheduling period. In an MSAP occasion, multiple MTCHs and dynamic scheduling information can be sent, as well as the MCCH. The dynamic scheduling information can be carried in the control part of the Media Access Control (MAC) or in an independent logical channel, namely a Multicast Scheduling Channel (MSCH). Generally, the length of an MSAP occasion is 320 ms, and similarly, a dynamic scheduling period (a scheduling period for short) is 320 ms in general. The scheduling period also may be $2^n \times 320$ ms (n=−3, −2, −1, 0, 1, 2, 3, 4 . . . N), correspondingly, the length of MSAP occasion is 40 ms, 80 ms, 160 ms, 320 ms, 640 ms, 1280 ms and etc. A time length of an MSAP occasion is a scheduling period, also called a dynamic scheduling period. One or more MBSFN sub-frames in one or more MBSFN frames are allocated in an MCH by MSAP, wherein the sub-frames sent in the multicast mode are called MBSFN sub-frames and the frames including the MBSFN sub-frames are called MBSFN frames.

Each MSAP occasion configured in an MCH carries dynamic scheduling information and mapping information of MTCHs to auxiliary MSAP sub-frames. The mapping information can be determined by the MBSFN sub-frame number index relationship in a scheduling period. According to the scheduling information, UE learns the MBSFN sub-frame which each of the MTCHs locates, acquires the required MTCH and neglects the unnecessary MBSFN sub-frames to increase the MBMS service receiving efficiency of the UE and reduce power consumption.

Specifically, the numbers of the MBSFN sub-frames can be determined by the following way: arranging all the MBSFN sub-frames allocated in a scheduling period of the MCH in order, and numbering them. For example, the total number of the MBSFN sub-frames allocated in a period of the MCH channel is 100, the numbers of the sub-frames ranges from 0 to 99, or from 1 to 100.

In the current LTE technology, multiple logical channels multiplex an MCH channel by the following way that: a sub-frame corresponds to a Transmission Time Interval (TTI); one or more transmission data blocks can be sent in a TTI; each transmission data block corresponds to a MAC Protocol Data Unit (PDU). A MAC PDU can contain multiple MAC Service Data Units (SDU); each MAC SDU can be from different logical channels (including MTCH, MCCH, MSCH etc.).

For dynamical multiplexing of the MBMS services, an MTCH or the data of an MBMS service is sent continuously in a scheduling period, which means that the data of a service continuously takes up the MBSFN sub-frame resources of the MCH channel, until all the service data of the service required to be sent in the scheduling period are sent. The data from different services can be sent in a same MBSFN sub-frame, which means that the service data from different MBMS services can be concatenated and sent in the same MAC PDU.

A synchronous protocol processing (SYNC) method is disclosed in relevant technologies, which comprises:

step S102: an upper-layer network element sends an MBMS service data packet to all lower-layer network elements; the service data packet carries service data, time stamp information, data packet serial number information, information of accumulated service data length and etc; the upper-layer network element marks the same time stamp information for one or more continuous service data packets; the data packets marked with the same time stamp form a data burst, or are called a synchronization sequence;

currently, the time stamp information of each data packet can be set by the following two ways: (1) containing the reference time information indicating when the synchronization sequence starts to be sent on a radio interface in each of the data packets contained in the synchronization sequence; (2) containing the reference time information indicating when one synchronization sequence starts to be sent on a radio interface in each of the data packets contained in the synchronization sequence;

step S104: for the service data carried by the service data packets contained in the same synchronization sequence, the lower-layer network element begins to send the service data packets successively via the radio interface at the time corresponding to the time stamp; since the information sent by the upper-layer network element to the lower-layer network element is completely consistent, all the lower-layer network elements can perform the same treatment to realize synchronous transmission of the MBMS services among cells of the lower-layer network elements;

step 106: the lower-layer network element allocate radio interface resources for one or more MBMS services at the radio interface; the resources can be dedicated only to an MBMS or shared by multiple MBMS services through time-division multiplexing; for example, in the LTE system, the MBMS services share the resources of an MCH channel in a dynamic multiplexing manner, or in the UMTS system, the multiple MBMS services share the resources of the same SCCPCH channel in an MBSFN manner.

Since the aforementioned MBMS service channel resources are configured in a static or semi-static manner, which means that, during a certain time period, the resources will not be adjusted according to the amount of the service data required to be sent during a scheduling period, thus during a certain time period or a scheduling period, the data amount of an MBMS service or multiple multiplexed MBMS services surpasses the transmission ability of the transmission channel in a certain time period. Under such situation, redundant data will be discarded by the lower-layer network element. If multiple services are multiplexed to the same channel, the lower-layer network element will determine data of which service has to be discarded according to the priorities of the services. This is called data overflow. For example, as shown in FIG. 1, service S1 and service S2 share the same channel, time period 1 and time period 2 in FIG. 1 can be two scheduling periods. According to the SYNC protocol, there is service data of service data S1 to be sent in both of the time period 1 and time period 2. In the time period 1, because the service data amount of S1 and S2 surpasses the maximum transmission ability of the channel resources corresponding to the time period 1, thus part of the service data of S2 cannot be sent.

As mentioned above, due to the dynamical property of the MBMS service, the flow of the service data changes greatly in different time periods, which means that there may be a great difference among the service data required to be sent in different scheduling periods, especially under the situation that one service use one channel or multiple services multiplex a channel while the amount of service is relatively small. Furthermore, resource configuration cannot be increased unlimitedly to meet the requirement of the changes in the service flow. Therefore, the current service data scheduling method may result in loss of service data, which further reduce the service quality.

SUMMARY

In view of this, the present invention provides a scheduling processing method for an MBMS service and a lower-layer network element to solve the problem of service quality decrease caused by loss of service data in the prior art.

According to one aspect of the present invention, a scheduling processing method for an MBMS service is provided. The method is used for each lower-layer network element to perform scheduling processing for data of an MBMS service received from an upper-layer element.

The scheduling processing method for an MBMS service according to the present invention comprises: receiving, by the lower-layer network element, information sent by a designated network element, wherein the information is used for indicating a scheduling period of the MBMS service; performing, by the lower-layer network element, scheduling processing for the data of the received MBMS service according to the scheduling period of the MBMS service indicated by the information.

According to another aspect of the present invention, a lower-layer network element is provided.

The lower-layer network element according to the present invention comprises: a first receiving unit, a second receiving unit and a scheduling processing unit. The first receiving unit is used for receiving data of an MBMS service from an upper-layer network element; the second receiving unit is used for receiving information indicating a scheduling period of the MBMS service from a designated network element; and the scheduling processing unit is used for performing scheduling processing for the data of the MBMS service received by the first receiving unit according to the scheduling period of the MBMS service indicated by the information received by the second receiving unit.

Through at least one solution of the present invention, the lower-layer element performs scheduling processing for the data of a received MBMS service according to the scheduling period of the MBMS service, thus the problem of the service data loss caused by deficient distribution of resources can be avoided and the service quality of the MBMS service can be improved.

Other features and advantages of the present invention will be described in the specification hereinafter. In addition, part of them will become more obvious in the specification, or learned by implementing the present invention. The objectives and other advantages of the present invention can be achieved by the structure specifically indicated in the specification, claims and drawings.

BRIEF DESCRIPTION OF THE DRAWING

The drawings are used for providing further understanding to the present invention and contributing to be a part of the specification to describe the present invention together with the embodiments, and are not used for limiting the present invention. In the drawings:

FIG. 3 shows a flowchart of a scheduling processing method for the MBMS service according to an embodiment of the present invention;

FIG. 4 shows a schematic diagram of the data scheduled in an MCH of embodiment I;

DETAILED DESCRIPTION

Function Overview

Since the MBMS service channel resources are configured in a static or semi-static manner in prior art, which brings the result that, during a certain time period or a scheduling period, the data amount of the MBMS service surpasses the transmission ability of the channel in the certain time, thus part of the MBMS service data is lost. The embodiments of the present invention provide an improved scheduling processing method for an MBMS service. In the embodiments of the present invention, a designated network element sends information indicating a scheduling period of an MBMS service to a lower-layer network element. The lower-layer network element performs the scheduling processing for the MBMS service data sent by the upper-layer network element according to the scheduling period of each MBMS service.

In the case of no collision, the embodiments and the features thereof in the present application can be combined mutually.

The preferred embodiments of the present invention are described hereinafter with reference to the drawings. It should be understood that the preferred embodiments here are merely used for explaining and illustrating the present invention, but not used for limiting the present invention.

The upper-layer network element and lower-layer network elements involved in the embodiments of the present invention are described before explaining the embodiments.

The upper-layer network element is used for scheduling the data packets of the received MBMS services. Specifically, the upper-layer network element marks time stamp information for each of the service data packets. The service data packets marked with the same time stamp information are called a data burst or a synchronization sequence. Then, the service data packets marked with the time stamp information are sent to one or more lower-layer elements attached to the upper-layer network element.

A lower-layer network element is used for receiving the service data packets sent by the upper-layer network element, calculating the start time for sending the synchronization sequence, performing Radio Link Control (RLC) concatenation processing for the data packets of the same synchronization sequence during the processing of the RLC protocol layer, and sending the service data packets processed by the radio network layer user-plane protocol at the radio interface. In order to enhance synchronous recovery in the case of packet loss at the radio interface, the lower-layer network element performs RLC restoration at the beginning of the synchronization sequence and begins to re-allocate the sequences of the RLC protocol layer.

Figure 1:
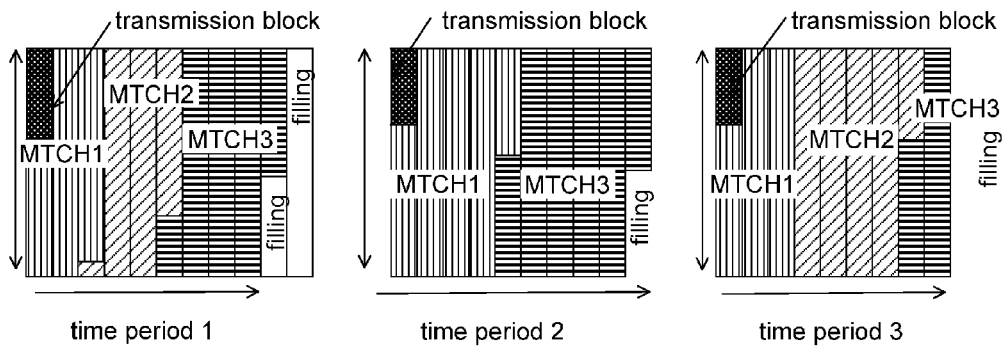
FIG. 1 shows a schematic diagram of scheduling blocks which indicating multiple MTCHs multicast resources in relevant technologies.
Figure 2:
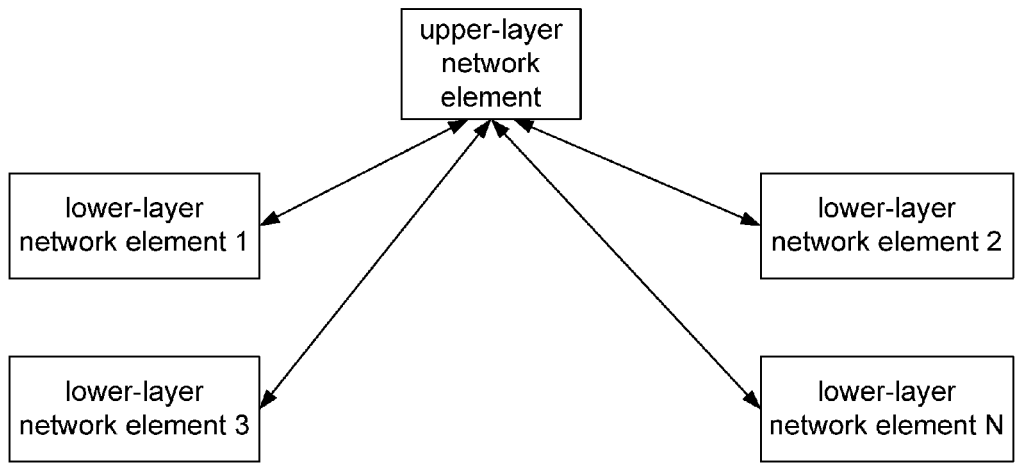
FIG. 2 shows a frame diagram of the logical structure of an upper-layer network element and lower-layer network elements.

FIG. 2 shows a frame diagram of the logical structure of an upper-layer network element and lower-layer network elements. As shown in FIG. 2, one upper-layer network element connects with multiple lower-layer network elements to perform signaling interaction. It should be noted that one upper-layer network element and one or more lower-layer network elements attached to the upper-layer network element can be the same network elements in physical function, or be different network elements. They are only logically divided into the upper-layer network element and the lower-layer network elements in order to concertedly complete the function of service synchronization. That is to say, several identical or different physical network elements are divided into an upper-layer network element and several lower-layer network elements according to their logical functions. These network elements work concertedly to transmit the MBMS services in a multi-cell-combination manner among the cells in the lower-layer elements.

The upper-layer network element and the lower-layer network elements can be the combinations of the following network elements, but not limited by the following combinations.

Combination 1, in the MBMS service synchronous networking of the UMTS Terrestrial Radio Access Network (UTRAN) system, the upper-layer network element is an upper-layer Radio Network Controller (RNC), and the lower-layer network element is lower-layer RNC, wherein the interface between the upper-layer network element and the lower-layer network element is Iur interface. In this combination, the upper-layer network element and the lower-layer network element have the same physical functions.

Combination 2, in the MBMS service synchronous networking of the High Speed Packet Access+ (HSPA+), the upper-layer network element is a Gateway General Packet Radio Service Supporting Node (GGSN), a Serving General Packet Radio Service Support Node (SGSN) or a Broadcast and Multicast Service Center (BMSC), the lower-layer network element is RNC or the node+ (NB+).

Combination 3, in the MBMS service synchronous networking of the LTE system, the upper-layer network element is a Media GateWay (MGW) or a multimedia broadcast and multicast coordination entity, the lower-layer network element is an E-UTRAN NodeB (eNB for short).

Based on the aforementioned technology, the present invention provides a scheduling processing method for an MBMS service, the method is used for each lower-layer network element to perform scheduling processing for the data of the received one or more MBMS services from the upper-layer network element.

According to the embodiments of the present invention, a scheduling processing method for an MBMS service is provided first.

FIG. 3 shows a flowchart of a scheduling processing method for the MBMS service according to an embodiment of the present invention. As shown in FIG. 3, for each lower-layer network element attached to the same upper-layer network element, after the data of one or more MBMS services from the upper-layer network element is received, the scheduling processing method for the MBMS service according to the embodiment of the present invention comprises the following steps (step S301-step S303).

Step 301: a lower-layer network element receives information, indicating scheduling periods of one or more MBMS services, sent by a designated network element.

In the specific implementation, the designated network element may be an upper-layer network element or a multimedia broadcast and multicast coordination entity.

Step S303: the lower-layer network element performs scheduling processing for the data of the received one or more MBMS services according to the scheduling periods of the one or more MBMS services.

In the specific implementation, the data of the one or more MBMS services (corresponding to one or more MTCHs) is mapped to an MCH; the lower-layer network element schedules the data of the one or more MBMS services in the predetermined transmission scheduling period of the MCH. Specifically, the lower-layer network element can schedule the data of the one or more MBMS services in the transmission scheduling period of the MCH according to the predetermined sequence and/or the predetermined scheduling amount. Furthermore, in order to facilitate a UE to obtain required data, scheduling information of all the MBMS services, required to be sent during a transmission scheduling period, can be set in the transmission scheduling period of the MCH. The scheduling information comprises: the information used for indicating the sub-frame positions (specifically determined by the numbers of the sub-frames) for sending the MBMS services during the transmission scheduling period.

In the embodiments of the present invention, for any two different scheduling periods in scheduling periods of the one or more MBMS service, a long scheduling period should be an integral multiple of a short scheduling period. For example, if there are three MBMS services, wherein the shortest MBMS service scheduling period is 100 ms, and the scheduling periods of the other two MBMS services are different from the shortest MBMS service scheduling period, then the scheduling periods of the other two MBMS services are integral multiple of the shortest MBMS service scheduling period. Furthermore, one MBMS service scheduling period of the other two MBMS services is n times the other MBMS service scheduling period, wherein n=1, 2, 3 ... N and N is an integer larger than or equal to 1.

In the specific implementation, the transmission scheduling period of the MCH can be determined by any one of the following ways:

(1) the upper-layer network element indicates the transmission scheduling period of the MCH to a lower-layer network element via signaling;

(2) the designated network element determines the transmission scheduling period the MCH according to the scheduling periods of the one or more MBMS services, and sends the transmission scheduling period to a lower-layer element;

preferably, in the embodiments of the present invention, the designated network element comprises the multimedia broadcast and multicast coordination entity;

(3) the lower-layer network element determines the transmission scheduling period of the MCH according to the scheduling periods of the received one or more MBMS services.

Preferably, the step that the lower-layer network element determines the sequence to schedule the data of the one or more MBMS services, comprises but not limited to one of the following ways:

(1) the scheduling processing is performed according to priority of the one or more MBMS services, specifically, the lower-layer network element can schedule first the MBMS service with high priority in the transmission scheduling period of the MCH, and then schedule the MBMS service with lower priority, and so on, until all the MBMS services required to be scheduled in the transmission scheduling period are scheduled;

(2) the scheduling processing is performed according to service quality of the one or more MBMS services, specifically, the lower-layer network element can schedule first the MBMS service with the best service quality in the transmission scheduling period of the MCH, and then schedule the MBMS service with lower service quality, until all the MBMS services required to be scheduled in the transmission scheduling period are scheduled;

(3) the scheduling processing is performed according to length of the scheduling periods of the one or more MBMS services, specifically, the lower-layer network element can schedule first the MBMS service with the shortest scheduling period in the transmission scheduling period of the MCH and then schedule the MBMS service with a longer scheduling period.

Although the scheduling sequence of the MBMS services is given in the embodiments of the present invention, it is not used for limiting the present invention. In the specific implementation, other sequences can be applied to schedule the MBMS services according to actual needs.

The scheduling amount of each of the MBMS services scheduled in the MCH can be determined but not limited by one of the following ways:

(1) scheduling the data of the one or more MBMS services according to the average data amount of each MBMS service in the one or more MBMS services required to be scheduled in the transmission scheduling period;

specifically, for example, supposing that the MBMS services required to be scheduled in a transmission scheduling period of the MCH comprise: S1, S2, ..., Sn, the data amount of each MBMS service required to be scheduled in the transmission scheduling period is:

$$\frac{T1}{Tm} \times Total_m,$$

where T1 is the transmission scheduling period of the MCH, Tm is the scheduling period of the MBMS $S_m$, $Total_m$ is the total data amount of the MBMS $S_m$ during the time period $T_m$;

(2) scheduling is performed according to time, that is scheduling the data of the MBMS services required to be scheduled in the transmission scheduling period according to the scheduling period of each MBMS service in the one or more MBMS services, specifically, multiple MBMS services can be arranged according to the lengths of their scheduling periods; in each transmission scheduling period, the data of the MBMS service with a short scheduling period is scheduled first and then the data of the MBMS service with a longer scheduling period is scheduled.

In the embodiments of the present invention, preferably, the transmission scheduling period of the MCH can be an integral multiple of the minimal or the maximal value of the scheduling periods of the one or more MBMS services.

The scheduling processing method for the MBMS services provided by the embodiments of the present invention is hereinafter illustrated by taking the case that the transmission scheduling period of the MCH is an integral multiple of the minimal or the maximal value of the scheduling periods of the one or more MBMS services as an example. In the following embodiments, there are multiple MBMS services required to be scheduled in the transmission scheduling period of the MCH.

Embodiment I

In the present embodiment, the transmission scheduling period of the MCH is the minimal value of the scheduling periods of the multiple MBMS services, that is, the transmission scheduling period of the MCH is the minimal service scheduling period of the multiple MBMS services.

Specifically, in the present embodiment, the scheduling processing method for the MBMS services mainly comprises the following steps:

(1) the designated network element informs the lower-layer network elements of the scheduling period length of the multiple MBMS services;

(2) each lower-layer network element performs scheduling processing for the received MBMS service synchronization sequences according to the scheduling period length of the received multiple MBMS services.

Specifically, each MBMS service synchronization sequence corresponds to a scheduling period length. Multiple MTCHs are mapped to an MCH which corresponds to the scheduling periods of the multiple MBMS services. The transmission scheduling period of the MCH in the present embodiment can be determined by the following way:

(1) the upper-layer network element (BMSC) indicates to the lower-layer network elements via signaling that the transmission scheduling period of the MCH is a minimal scheduling period;

(2) the multimedia broadcast and multicast coordination entity chooses a minimal service scheduling period length according to the scheduling periods of the MBMS services and informs the lower-layer network elements (namely eNB) of the minimal service scheduling period length; the lower-layer network elements take the period length as the transmission scheduling period of the MCH;

(3) the lower-layer network elements (e.g. eNB) choose a minimal service scheduling period as the transmission scheduling period of the MCH according to the scheduling periods of the received MBMS services.

Furthermore, in the present embodiment, the scheduling periods of the multiple MBMS services are arranged according to the lengths thereof from the shortest to the longest, wherein for the scheduling periods of any two MBMS services with different lengths, the length of the long service scheduling period is an integral multiple of the short one. Furthermore, the transmission scheduling period of the MCH transmission channel is the minimal service scheduling period.

In the present embodiment, division is performed according to the minimal MBMS service scheduling period, each minimal scheduling period contains corresponding scheduling information. The scheduling information comprises the scheduling information of all the MBMS services required to be sent during the minimal scheduling period. For example, the scheduling information is used for indicating the sub-frame positions where the multiple MBMS services locate during the minimal scheduling period and etc.

In the specific implementation, the lower-layer network elements can schedule the data of the multiple MBMS services according to the following sequence:

(1) Scheduling is performed according to the priority. A lower-layer network element first schedules the MBMS service with the highest priority during the minimal scheduling period, and then schedules the MBMS service with lower priority. Specifically, the lower-layer network element first sets the service data with the highest priority at the channel resources where an MBSFN sub-frame corresponding to the time stamp of the service data with the highest priority begins; then sets the service data with lower priority at channel resources which have not been occupied and where the MBSFN sub-frame corresponding to the time stamp of the service data with the lower priority begins; and sets other service data during the scheduling periods in this way.

(2) Scheduling is performed according to the service quality. A lower-layer network element first schedules the MBMS service with the best service quality during the minimal scheduling period, and then schedules the MBMS service with worse service quality. Specifically, the lower-layer network element first sets the service data with the best service quality at the channel resources where an MBSFN sub-frame corresponding to the time stamp of the service data with the best service quality begin; then sets the service data with worse service quality at the channel resources which have not been occupied and where the MBSFN sub-frame corresponding to the time stamp of the service data with the worse service priority begins; and sets other service data during the scheduling periods in this way.

(3) Scheduling is performed according to the scheduling time. A lower-layer network element first schedules the MBMS service with the shortest scheduling period during the minimal scheduling period and then schedules the MBMS service with a longer scheduling period. Specifically, the lower-layer network element first sets the service data with the shortest scheduling period at the channel resources where the MBSFN sub-frame corresponding to the time stamp of the service data with the shortest scheduling period begins, and then set the service data with a longer scheduling period at the channel resources which have not been occupied and where the MBSFN sub-frame corresponding to the time stamp of the service data with a longer scheduling period begins, and sets other MBMS service data corresponding to each scheduling period in this way. For multiple services with the same scheduling period, the lower-layer network element can respectively schedule and arrange the data of the multiple services at the corresponding resource positions according to the sending sequence or priority of the services.

For the scheduling amount scheduled in the transmission scheduling period, the lower-layer network element can schedule the data of the MBMS services according to the following ways:

(1) Average Scheduling

Specifically, supposing that MBMS services required to be scheduled during the minimal scheduling period is S1, S2, ..., Sn, the data amount of each MBMS service required to be scheduled during the minimal scheduling period is:

$$\frac{T1}{Tm} \times Total_m,$$

where T1 is the minimal scheduling period, Tm is the scheduling period of the MBMS Sm, $Total_m$ is the total data amount of the MBMS Sm during the time period Tm;

(2) Time Scheduling

During the minimal scheduling period, according to the time requirement, multiple MBMS services are arranged according to the length of the scheduling period; in each minimal scheduling period, the data of the MBMS service with the shortest scheduling period is scheduled first and the data of the MBMS service with a longer scheduling period is scheduled later.

For example, as shown in FIG. 4, two MBMS services, i.e. a real-time service S1 and a non-real-time service S2, have scheduling periods T1 and T2 respectively, and T2 is two times as long as T1. The two MBMS services are mapped to the same MCH channel, which means that the MCH has two service scheduling periods: T1 and T2. The MBMS service S2 with the scheduling period T2 is allocated to two periods (each with a length of T1) for scheduling. The scheduling information in each scheduling period T1 contains the scheduling information of the MBMS service S1, or the scheduling information of both the MBMS services S1 and S2. All the data in the scheduling period T1 of the MBMS service S1 and half of the data in the scheduling period T2 of the MBMS service S2 are scheduled during each scheduling period T1.

Embodiment II

In the present embodiment, the transmission scheduling period of the MCH is an integral multiple of the maximal value of the scheduling periods of the multiple MBMS services (which can be 1, 2, 3 ... N times of the maximal value, wherein N is larger than or equal to 1), which means that the transmission scheduling period of the MCH is an integral multiple of the maximal service scheduling period of the multiple MBMS services.

In the present embodiment, the method for determining the transmission scheduling period of the MCH is similar to that of the embodiment I. The difference is that the determined transmission scheduling period is the maximal value of the scheduling periods of the MBMS services. Therefore, it is unnecessary to go into details here.

Furthermore, in the present embodiment, due to division is performed according to the maximal scheduling period of the MBMS services, it only needs to set the corresponding scheduling information in the transmission scheduling period of the MCH and scheduling information is unnecessary to be set at other positions. That is to say, compared with the embodiment I, in the present embodiment, the quantity of the scheduling information during the maximal scheduling period of the MBMS services is less than that in the embodiment I, and the data of a service can be scheduled and sent for many times during a transmission scheduling period of the MCH. The scheduling information set in a transmission scheduling period contains scheduling information of all the MBMS service required to be sent in the transmission scheduling period. For example, the scheduling information is used for indicating the sub-frame positions where the data of multiple MBMS services locates in multiple different scheduling periods, and etc.

Furthermore, in the present embodiment, the sequence for a lower-layer network element to schedule the data of MBMS services is similar to that in the embodiment I. Therefore, it is unnecessary to go into details here.

Similarly, the determination method for scheduling amount is similar to that in the embodiment I. The difference is that, in the present embodiment, the transmission scheduling period of the MCH is an integral multiple of the maximal scheduling period of the MBMS services. Therefore, if the average scheduling method is employed to determine the data amount of an MBMS service scheduled in a transmission scheduling period of the MCH, the value of T1 is the transmission scheduling period (namely an integral multiple of the maximal scheduling period). when the time scheduling is employed, the sequences of MBMS services which need to be scheduled in a transmission scheduling period are scheduled respectively in the transmission scheduling period. The details are shown as FIG. 5.

Figure 5:
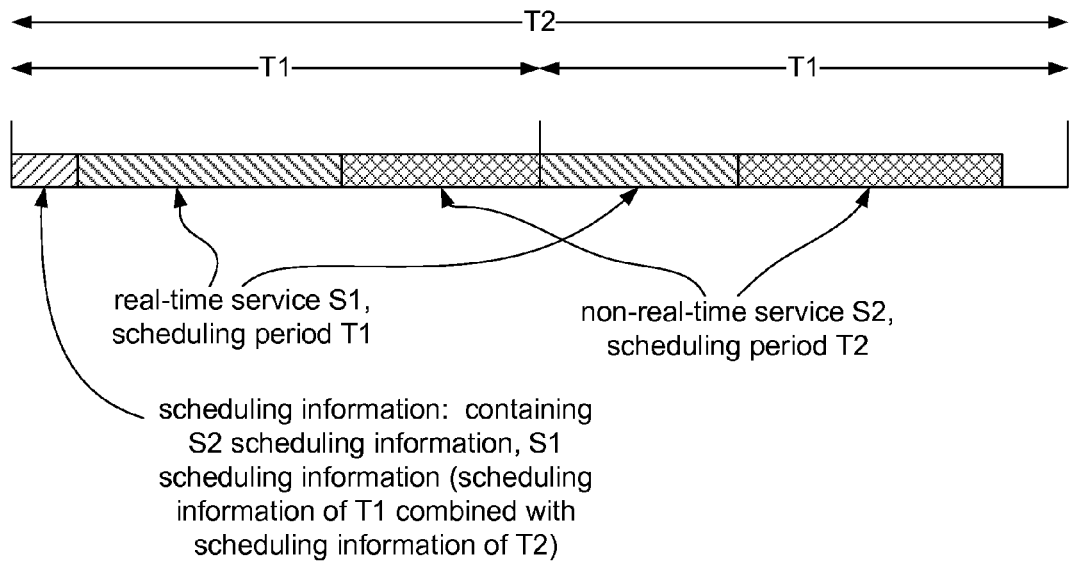
FIG. 5 shows a schematic diagram of the data scheduled in an MCH of embodiment II.

FIG. 5 shows a schematic diagram of the data scheduled in a transmission scheduling period of the MCH of the present embodiment. As shown in FIG. 5, for example, two MBMS services, i.e. a real-time service S1 and a non-real-time service S2, have scheduling periods T1 and T2 respectively, and T2 is two times as long as T1. The two MBMS services are mapped to the same MCH channel, which means that the MCH can choose one of the scheduling periods, that is T2, which is one time as long as the maximal service scheduling period. The MSMS service S1 with a scheduling period T1 is allocated to a period with the corresponding scheduling period T2 to be scheduled. The scheduling information in each scheduling period T2 contains the scheduling information of the MBMS service S1 and S2 during the scheduling period T2. All the data in the scheduling period T1 of the MBMS service S1 and all the data in the scheduling period T2 of the MBMS service S2 are scheduled during the scheduling period T2.

According to the scheduling processing method for the MBMS services provided by the embodiments of the present invention, the transmission scheduling period of the MCH can be determined according to the scheduling periods of the MBMS services to avoid the service data loss caused by uneven distribution of the resources.

According to an embodiment of the present invention, a lower-layer network element is provided to achieve the aforementioned method of the present invention.

Figure 6:
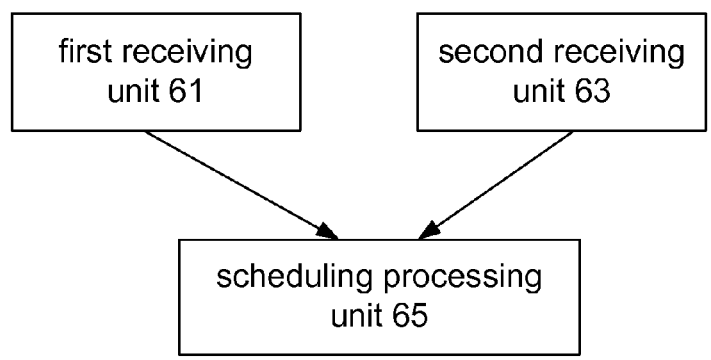
FIG. 6 shows a structural diagram of a lower-layer network element according to an embodiment of the present invention.

FIG. 6 shows a structural diagram of a lower-layer network element according to the embodiment of the present invention. As shown in FIG. 6, the lower-layer network element according to the embodiment of the present invention mainly comprises: a first receiving unit 61, a second receiving unit 63 and a scheduling processing unit 65. The first receiving unit 61 is used for receiving data of one or more MBMS services from a upper-layer network element; the second receiving unit 63 is used for receiving information indicating scheduling periods of the one or more MBMS services from a designated network element; the scheduling processing unit 65 connects with the first receiving unit 61 and the second receiving unit 63, and is used for performing scheduling processing for the data of the one or more MBMS services received by the first receiving unit 61 according to the scheduling periods of the one or more MBMS services.

As stated above, with the help of the technical solutions provided by the embodiments of the present invention, through the designated network element sends the scheduling periods of the MBMS services to each lower-layer network element, each lower-layer network element can determine the transmission scheduling period of the MCH according to the scheduling periods of the MBMS services, and perform scheduling processing for the data of a received MBMS service according to the scheduling period of the MBMS service, thus the problem of the service data loss caused by deficient distribution of the resources can be avoided and the service quality of the MBMS services can be improved.

The above is only preferred embodiments of the present invention and is not used for limiting the present invention. For those skilled in the art, there may be various modifications and changes to the present invention. Any modifications, equivalent replacements and improvements and the like within the principle of the present invention shall fall within the protection scope of the present invention.

What is claimed is:

1. A scheduling processing method for a Multimedia Broadcast and Multicast Service (MBMS), used for each of lower-layer network elements to perform scheduling processing for data of art MBMS services received from an upper-layer network element, comprising:

receiving, by each of the lower-layer network elements, information sent by a designated network element, wherein the information is used for indicating a scheduling periods of the MBMS services, and wherein the designated network element comprises a multimedia broadcast and multicast coordination entity;

performing, by each of the lower-layer network elements, scheduling processing for the data of the received MBMS services during a transmission scheduling period of a Multicast Channel (MCH) based on a predetermined sequence and/or predetermined scheduling amount, according to the scheduling periods of the MBMS services indicated by the information;

wherein the step that each of the lower-layer network elements performs the scheduling processing for the data of the received MBMS services is according to the predetermined sequence, the predetermined sequence is a length sequence of the scheduling periods of the MBMS services;

wherein the scheduling processing according to the length sequence by each of the lower-layer network elements comprises:

arranging the received MBMS services at corresponding resource positions according to the length sequence of the scheduling periods including:

first scheduling the MBMS service with the shortest scheduling period during the transmission scheduling period; then scheduling the MBMS service with the longer scheduling; and wherein the transmission scheduling period of the MCH is an integral multiple of a minimum MBMS scheduling period containing the scheduling period information of the MBMS service.

2. The method according to claim 1, wherein the method for determining the transmission scheduling period of the MCH comprises one of the followings:

indicating, by the upper-layer network element, the transmission scheduling period of the MCH to each of the lower-layer network elements via signalling;

determining, by the designated network element, the transmission scheduling period of the MCH according to the scheduling period of the MBMS service and sending the transmission scheduling period of the MCH to each of the lower-layer network elements via signalling;

determining, by each of the lower-layer network elements, the transmission scheduling period of the MCH according to the scheduling periods of the received MBMS services.

3. The method according to claim 2, wherein scheduling information of all MBMS services, which are required to be sent during the transmission scheduling period, is set in the transmission scheduling period of the MCH, wherein the scheduling information comprises: information used for indicating a sub-frame position for sending the MBMS service during the transmission scheduling period.

4. The method according to claim 2, wherein for any two different scheduling periods of MBMS services, a long scheduling period is an integral multiple of a short scheduling period.

5. The method according to claim 2, wherein the transmission scheduling period of the MCH is an integral multiple of a maximal value of the scheduling period of the MBMS service.

6. The method according to claim 1, wherein the step that each of the lower-layer network elements performs the scheduling processing for the data of the received MBMS services according to the predetermined sequence further comprises one of the followings:
performing the scheduling processing according to priority sequence of the MBMS service;
performing the scheduling processing according to service quality sequence of the MBMS service.

7. The method according to claim 6, wherein scheduling information of all MBMS services, which are required to be sent during the transmission scheduling period, is set in the transmission scheduling period of the MCH, wherein the scheduling information comprises: information used for indicating a sub-frame position for sending the MBMS service during the transmission scheduling period.

8. The method according to claim 6, wherein for any two different scheduling periods of MBMS services, a long scheduling period is an integral multiple of a short scheduling period.

9. The method according to claim 5, wherein the transmission scheduling period of the MCH is an integral multiple of a maximal value of the scheduling period of the MBMS service.

10. The method according to claim 1, wherein the step that each of the lower-layer network elements performs the scheduling processing for the data of the received MBMS services according to the predetermined scheduling amount comprises one of the followings:
performing, by each of the lower-layer network elements, the scheduling processing for the data of the received MBMS services according to average data amount of each MBMS service in received MBMS services which is required to be scheduled in the transmission scheduling period;
performing, by each of the lower-layer network elements, the scheduling processing for the data of the received MBMS services according to the scheduling period of each MBMS service in the received MBMS services.

11. The method according to claim 10, wherein scheduling information of all MBMS services, which are required to be sent during the transmission scheduling period, is set in the transmission scheduling period of the MCH, wherein the scheduling information comprises: information used for indicating a sub-frame position for sending the MBMS service during the transmission scheduling period.

12. The method according to claim 10, wherein for any two different scheduling periods of MBMS services, a long scheduling period is an integral multiple of a short scheduling period.

13. The method according to claim 10, wherein the transmission scheduling period of the MCH is an integral multiple of a maximal value of the scheduling period of the MBMS service.

14. The method according to claim 1, wherein scheduling information of all MBMS services, which are required to be sent during the transmission scheduling period, is set in the transmission scheduling period of the MCH, wherein the scheduling information comprises: information used for indicating a sub-frame position for sending the MBMS service during the transmission scheduling period.

15. The method according to claim 1, wherein for any two different scheduling periods of MBMS services, a long scheduling period is an integral multiple of a short scheduling period.

16. The method according to claim 1, wherein the transmission scheduling period of the MCH is an integral multiple of a maximal value of the scheduling period of the MBMS service.

17. A lower-layer network element, comprising:
a first receiving unit, used for receiving data of MBMS services from an upper-layer network element;
a second receiving unit, used for receiving information indicating scheduling periods of the MBMS services from a designated network element, wherein the designated network element comprises a multimedia broadcast and multicast coordination entity;
a scheduling processing unit, used for performing scheduling processing for the data of the MBMS services received by the first receiving unit during a transmission scheduling period of a Multicast Channel (MCH) based on a predetermined sequence and/or predetermined scheduling amount, according to the scheduling periods of the MBMS services indicated by the information received by the second receiving unit;
wherein the scheduling processing for the data of the received MBMS service is according to the predetermined sequence, the predetermined sequence is a length sequence of the scheduling periods of the MBMS services;
wherein the scheduling processing according to the length sequence by scheduling processing unit comprises:
arranging the received MBMS services at corresponding resource positions according to the length sequence of the scheduling periods including:
first scheduling the MBMS service with the shortest scheduling period during the transmission scheduling period;
then scheduling the MBMS service with the longer scheduling; and
wherein the transmission scheduling period of the MCH is an integral multiple of a minimum MBMS scheduling period containing the scheduling period information of the MBMS service.

* * * * *